United States Patent
King

[11] Patent Number: 6,112,640
[45] Date of Patent: Sep. 5, 2000

[54] CYLINDER

[76] Inventor: Jeffrey R. King, 13041 Wedel, Trufant, Mich. 49347

[21] Appl. No.: 09/187,312

[22] Filed: Nov. 4, 1998

Related U.S. Application Data

[63] Continuation-in-part of application No. 09/063,662, Apr. 21, 1998.

[51] Int. Cl.$^7$ .................................................. F01B 29/00
[52] U.S. Cl. .............................................. 92/128; 92/161
[58] Field of Search ............................... 92/128, 161, 718

[56] References Cited

U.S. PATENT DOCUMENTS

| | | | |
|---|---|---|---|
| 837,207 | 11/1906 | engeln ........................................ | 92/118 |
| 2,506,277 | 5/1950 | Panik et al. ............................ | 92/161 X |
| 2,673,130 | 3/1954 | Becker .................................... | 92/161 X |
| 2,677,933 | 5/1954 | Hopkinson . | |
| 2,687,910 | 8/1954 | Petch et al. . | |
| 2,798,688 | 7/1957 | Affleck .................................. | 92/161 X |
| 2,839,218 | 7/1958 | Zerbe . | |
| 2,890,917 | 6/1959 | Prince . | |
| 2,945,676 | 7/1960 | Kammerer, Jr. ........................... | 92/161 |
| 2,952,480 | 9/1960 | Prill et al. . | |
| 2,975,762 | 3/1961 | Blatt et al. ............................. | 92/161 X |
| 3,096,077 | 7/1963 | Forsyth ................................. | 92/116 X |
| 3,153,988 | 10/1964 | Warstler ................................ | 92/161 X |
| 3,168,014 | 2/1965 | Aslan ...................................... | 92/118 |
| 3,168,853 | 2/1965 | Prince ..................................... | 91/167 |
| 3,437,230 | 4/1969 | Savory . | |
| 3,474,710 | 10/1969 | Stryker . | |
| 3,494,652 | 2/1970 | Langland ............................. | 92/128 X |
| 3,650,182 | 3/1972 | Phillips . | |
| 3,967,539 | 7/1976 | Williamson .......................... | 92/161 X |
| 3,986,635 | 10/1976 | Niskin . | |
| 4,312,264 | 1/1982 | Nunnemacher et al. ................. | 92/161 |
| 4,326,749 | 4/1982 | Bender .................................. | 92/118 X |
| 4,496,071 | 1/1985 | Stewart . | |
| 5,245,911 | 9/1993 | Yuda . | |
| 5,357,847 | 10/1994 | Stewart . | |
| 5,400,695 | 3/1995 | Walker . | |
| 5,471,708 | 12/1995 | Lynch .................................. | 92/128 X |
| 5,669,284 | 9/1997 | Fish . | |
| 5,904,089 | 5/1999 | Jansson et al. ......................... | 92/118 |

FOREIGN PATENT DOCUMENTS

| | | | |
|---|---|---|---|
| 53746 | 12/1944 | France ..................................... | 92/161 |
| 1474029 | 5/1977 | United Kingdom ..................... | 92/128 |

*Primary Examiner*—John E. Ryznic
*Attorney, Agent, or Firm*—Van Dyke, Gardner, Linn & Burkhart, LLP

[57] ABSTRACT

A cylinder includes a cylindrical casing, a cap mounted to the cylindrical casing, a retaining member, a mounting member and a piston rod assembly which is positioned in the interior of the cylindrical casing. The cylindrical casing includes a casing wall which extends along a longitudinal axis and defines an interior, an open end, and a closed end. The piston rod assembly includes a rod end and a piston, with the piston including at least one piston seal sealing against an inner surface of the casing wall, which divides the interior of the casing wall into first and second fluid reservoirs. The rod end of the piston rod assembly extends through the cap and moves between extended positions and retracted positions as a function of the pressures in the first and second reservoirs. The casing wall may have a first annular groove adjacent the open end, and a first port, which is in fluid communication with the first fluid reservoir for delivering fluid to the first fluid reservoir, is provided in either the closed end or the casing wall. The cap includes a second port, which is in fluid communication with the second reservoir for delivering fluid to the second reservoir, and may include a second annular groove which is aligned with the first annular groove of the casing wall when the cap is mounted to the open end of the casing wall, thus defining a cavity therebetween. The retaining member is positioned in the cavity and limits the longitudinal movement of the cap with respect to the cylindrical casing and, yet, permits rotational movement of the cap with respect to the cylindrical casing about the longitudinal axis of the casing, thereby, permitting adjustment of the second port about the longitudinal axis of the cylindrical casing. The mounting member is rotatably secured to the closed end of the cylinder and allows rotation of a mounting attachment relative the cylinder while preventing longitudinal movement therebetween.

29 Claims, 7 Drawing Sheets

CYLINDER

This is a Continuation-in-Part application of patent application Ser. No. 09/063,662 entitled IMPROVED CYLINDER, filed on Apr. 21, 1998, which is hereby incorporated herein by reference.

TECHNICAL FIELD AND BACKGROUND OF THE INVENTION

The present invention relates to a cylinder and, more particularly, to a cylinder which can be easily adjusted to suit field conditions.

Cylinders have numerous applications and are often used in machines to move parts or provide lifting mechanisms. Typically, cylinders comprise a hollow outer cylindrical casing, which includes a closed end on one end of the casing and a removable end cap on an opposed end of the casing. A piston, which is mounted on a rod, is positioned in the cylindrical casing and includes a seal, which seals the space between the piston and the cylindrical casing. The free end of the rod extends through the removable end cap for connection to the machine. In a double acting cylinder, the piston divides the hollow interior of the cylindrical casing into two reservoir areas. Conventionally, in a double acting cylinder, the casing includes two ports—a first port which is in communication with the first reservoir, and a second port which is in communication with the second reservoir. In this manner, fluid, such as hydraulic fluid, air, or air over oil, can be delivered to the respective reservoirs to apply pressure to the piston to move the piston and rod along the longitudinal axis of the hollow cylindrical casing. Thus, the free end of the piston, which extends through the end cap of the hollow cylindrical casing, extends or contracts in response to the pressures of the fluid in the reservoirs.

Typically, both ports are provided on the hollow-casing wall. As a result, the relative positions of the two ports are fixed, which in some instances limits the application of the cylinders. Furthermore, by locating the ports in the casing, the overall length of the casing, and therefore the cylinder, is proportionately increased by the diameters of the ports. Again, as a result, in some applications the use of cylinders is precluded.

Proposals have been made to include a port in the base of a cylinder. For example, U.S. Pat. No. 2,890,917 to Prince and U.S. Pat. No. 3,494,652 to Langland each disclose double acting hydraulic cylinders with ends (32 and 26, respectively) which are held in place by snap rings and/or a retaining ring. In the Langland cylinder, the snap rings limit the movement in both left hand and right-hand directions. As a result, the positions of the ports 30 and 39 are fixed relative to each other, and removal of the snap rings is needed to permit adjustment.

Typically, cylinders further include a coupler or attachment at each end of the cylinder, which allows the pressure plate or rod of the cylinder to be connected to a respective piece of equipment or machinery. However, these attachments are typically fixed with respect to the body of the cylinder, such that the attachment cannot be rotated to align with the corresponding attachment of the respective equipment. Consequently, where an application requires a different orientation of the attachment on the cylinder, the application will require a custom cylinder having attachments oriented specifically for that application.

Consequently, there is a need for a cylinder with adjustable ports and adjustable attachments to facilitate and simplify installation. Furthermore, there is a need for a cylinder which has a reduced length to increase its application. With reduced lengths, the overall weight and cost of equipment and machines employing such cylinders may be significantly reduced.

SUMMARY OF THE INVENTION

Accordingly, the present invention provides a new and improved cylinder, which includes an improved assembly that permits the ports which deliver fluid, such as hydraulic fluid, air, or air over oil, to the reservoirs of the cylinder to be adjusted without disassembly of the cylinder.

According to one aspect of the invention, a cylinder includes a cylindrical casing, a cap mounted to the cylindrical casing, a wire member, and a piston rod assembly which is positioned in the interior of the cylindrical casing. The cylindrical casing includes a casing wall which extends along a longitudinal axis and defines an interior, an open end, and a closed end. The piston rod assembly includes a rod end and a piston, with the piston including at least one piston seal sealing against an inner surface of the casing wall, which divides the interior of the casing wall into first and second reservoirs. The rod end of the piston rod assembly extends through the cap and moves between extended positions and retracted positions as a function of the pressures in the first and second reservoirs. The casing wall has a first annular groove adjacent the open end. A first port, which is in fluid communication with the first fluid reservoir for delivering fluid to the first fluid reservoir, is provided in either the closed end or the casing wall. The cap includes a second port, which is in fluid communication with the second reservoir for delivering fluid to the second reservoir, and a second annular groove which is aligned with the first annular groove of the casing wall when the cap is mounted to the open end of the casing wall, thus defining a cavity therebetween. The wire member is positioned in the cavity and limits the longitudinal movement of the cap with respect to the cylindrical casing and, yet, permits rotational movement of the cap with respect to the cylindrical casing about the longitudinal axis of the casing, thereby, permitting adjustment of the second port about the longitudinal axis of the cylindrical casing.

In one form, a mounting member is mounted to the closed end of the cylindrical casing. The mounting member includes a mounting extension protruding from the closed end along the longitudinal axis of the cylindrical casing and a mounting attachment which is rotatably secured to the mounting extension.

In one form, the cap includes a portion which extends into the second open end of the casing, with the first annular groove being formed on an inner surface of the casing wall, and the second annular groove being formed on an outer surface of the portion. Alternately, the second end of the cylindrical casing extends into the cap, with the first annular groove being formed on an outer surface of the casing wall, and the second annular groove being formed on the inner surface of the cap.

In another form, a base member is secured to the casing wall which defines the closed end of the cylindrical casing. In other forms, the base member includes a third annular groove, and the casing wall includes a fourth annular groove which is aligned with the third annular groove to define a second cavity when the base member is mounted to the casing wall. Optionally, the second port is provided in base member which reduces the overall length of the cylinder. Preferably, a second wire member is positioned in the second cavity to secure the base member to the casing wall to limit longitudinal movement of the base member with respect to the casing wall while allowing rotational movement of the base member about the casing wall.

According to another aspect of the invention, the cylinder includes a cylindrical casing with a casing wall extending along a longitudinal axis and defining an interior with first and second opposed open ends. The casing wall includes an annular groove adjacent the second open end. A base member is secured to the first open end with one of the base member and the casing wall including a first port for delivering fluid into one of two fluid reservoirs in the interior of the cylindrical casing. A cap is mounted onto the second open end, which includes an annular collar and a second port for delivering fluid to the other of the two reservoirs in the interior of the casing. The annular collar includes a second annular groove, which is aligned with the annular groove of the casing wall when the cap is mounted to the second open end and defines a cavity therebetween. A retaining member is positioned in the cavity to thereby limit longitudinal movement of the cap with respect to the cylindrical casing and permit rotational movement of the cap about the cylindrical case and permit adjustment of the position of the second port about the longitudinal axis of the cylindrical casing. A piston rod assembly is positioned in the interior of the casing, which includes a rod end and a piston. The piston includes at least one piston seal sealing against an inner surface of the casing wall which divides the interior into first and second fluid reservoirs, with the first port being in fluid communication with the first reservoir, and the second port being in fluid communication with the second reservoir. The rod end extends through the cap and moves between extended and retracted positions as a function of the fluid pressures in the first and second fluid reservoirs.

In one form, a mounting member is mounted to the base member. The mounting member includes a mounting extension protruding from the base member and a mounting attachment which is rotatably secured to the mounting extension. In another form, the mounting extension is non-rotatably secured through the base member such that an attaching end extends outward from the base member.

In another form, the first port is located in the base member, which thereby reduces the overall length of the cylinder.

In other forms, the retaining member is a generally rectangular cross-section wire member.

According to yet another aspect of the invention, a cylinder includes a cylindrical casing which includes a casing wall and a longitudinal axis. The casing wall defines an interior and first and second opposed open ends and has a first annular groove adjacent the first open end and a second annular groove adjacent the second open end. A base member is mounted to the first open end of the cylindrical casing which includes a third annular groove and a first seal for sealing against the casing wall and a first port for delivering fluid into one of two fluid reservoirs in the interior of the cylindrical casing. The third annular groove aligns with the first annular groove on the casing wall when the base member is mounted to the first open end and defines a first cavity therebetween. A cap is mounted to the second open end of the cylindrical casing and includes a second port and an annular collar. The annular collar includes a fourth annular groove and a second seal sealing against the casing wall. The fourth annular groove aligns with the second annular groove of the casing wall when the cap is mounted to the second open end and defines a second cavity therebetween. First and second retaining members are respectively positioned in the first and second cavities to thereby limit longitudinal movement of the base member and the cap, respectively, with respect to the casing wall and permit rotational movement of the base member and the cap, respectively, about the casing wall. Furthermore, the retaining members permit independent adjustment of the respective positions of the first and second ports about the longitudinal axis of the cylindrical casing. A piston rod assembly is positioned in the interior of the casing wall, which includes a rod end and a piston, with the piston including at least one piston seal sealing against the inner surface of the casing wall. The piston divides the interior of the casing wall into first and second reservoirs, with the first port being in fluid communication with the first reservoir, and the second port being in fluid communication with the second reservoir. The rod end extends through the cap and moves between extended and retracted positions as a function of fluid pressures and the respective reservoirs.

In one form, at least one of the first port and second port is recessed in the base member or the cap, respectively. In other forms, the cap includes a portion which extends into the second open end of the casing wall, with the portion including the fourth annular groove and the cap seal for sealing against the casing wall. In yet other forms, the base member includes a portion extending into the first open end of the casing wall, with the portion including the fourth annular groove and the base seal for sealing against the casing wall. Preferably, one of the cap and the casing wall includes a slotted opening for inserting the first or second wire into the first or second cavity, respectively.

In another form, a mounting member is mounted to the base member. The mounting member includes a mounting extension protruding from the base member and a mounting attachment rotatably secured to the mounting extension. The mounting extension may be non-rotatably secured to an exterior surface of the base member or, alternatively, inserted through the base member along the longitudinal axis of the cylindrical casing.

As will be understood, the cylinder of the present invention provides several advantages over prior known cylinders. The cylinder permits adjustment of one or more ports about a longitudinal axis of the cylinder to accommodate various installations and field conditions. Furthermore, by locating the ports in the pressure plate and/or gland nut, the overall length the cylinder can be reduced and, thus, increase the application of the cylinder. These and other objects, advantages, purposes and features of the invention, will become more apparent from the study of the following description taken in conjunction with the drawings.

DESCRIPTION OF THE PREFERRED EMBODIMENTS

Figures 1, 6:
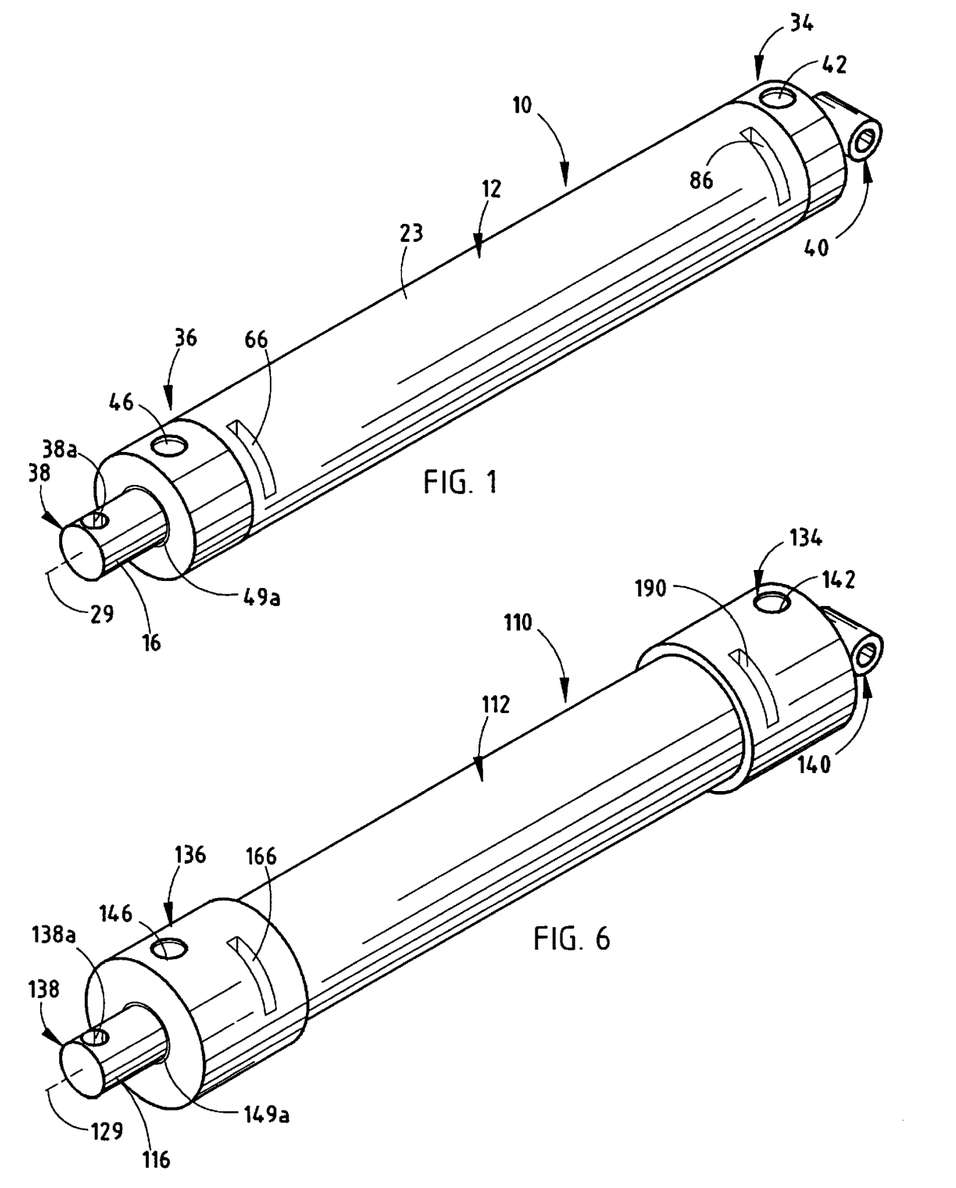
FIG. 1 is a perspective view of a first embodiment of a cylinder of the present invention.
FIG. 6 is a perspective view of a second embodiment of the cylinder of the present invention.
Figure 2:
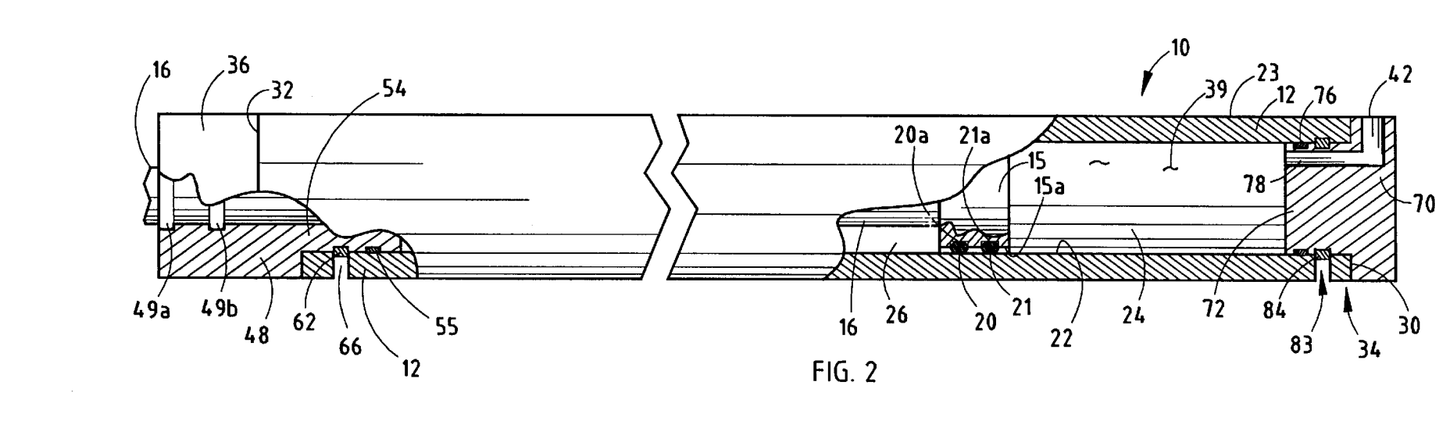
FIG. 2 is an exploded perspective view of the cylinder of FIG. 1.
Figure 3:
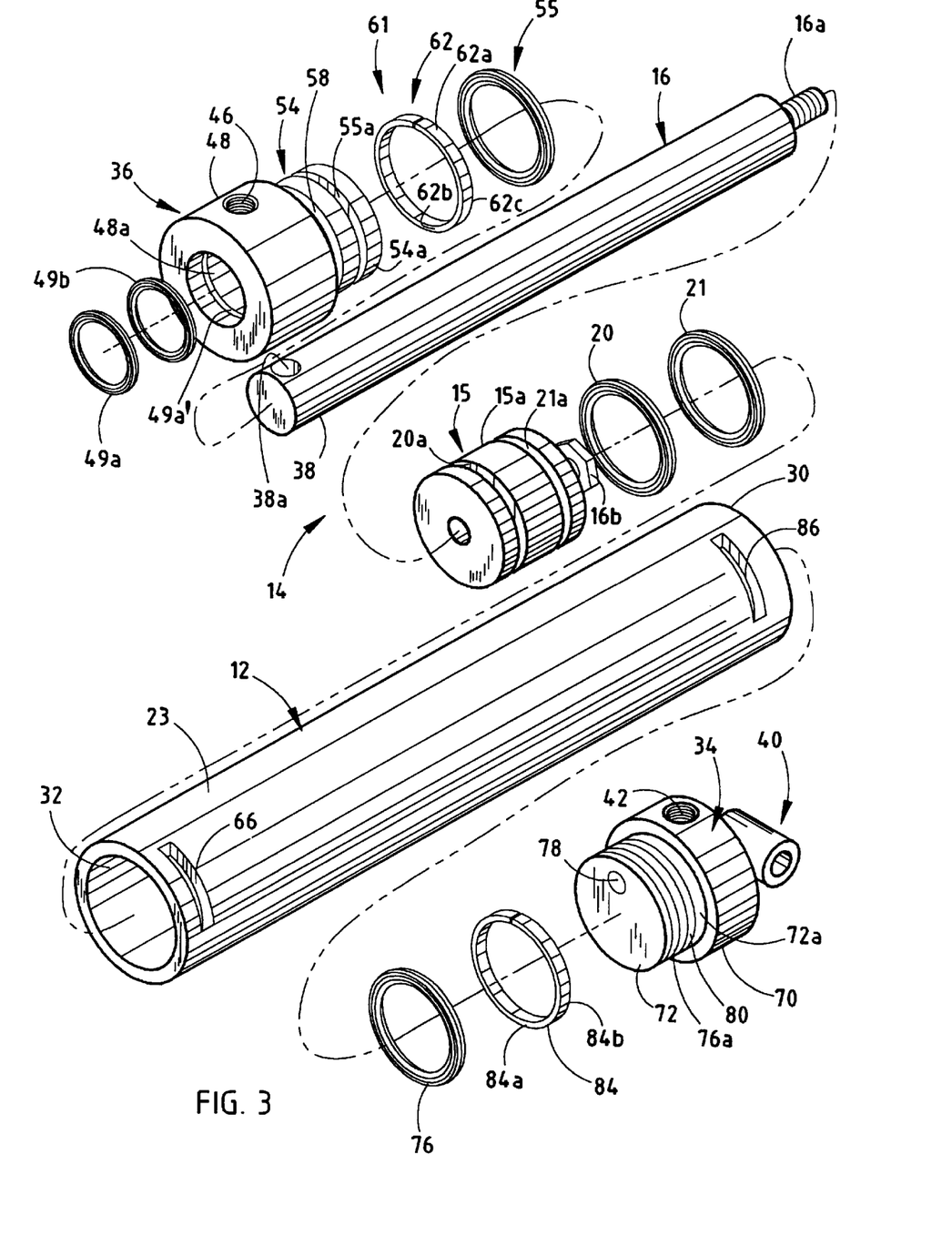
FIG. 3 is a partial fragmentary side view of the cylinder of FIG. 1.

Referring to FIGS. 1–3, the numeral 10 generally designates a double acting cylinder of the present invention. Cylinder 10 includes a hollow tubular or cylindrical metal casing 12 and a piston rod assembly 14. Piston rod assembly 14 includes a metal piston 15 mounted onto a threaded portion 16a of a metal rod 16 by a nut 16b, which is preferably at least partially recessed in the piston 15. Rod 16 extends through casing 12 and projects from casing for coupling to a component or a part of a machine, as will be more fully described below. Piston 15 is positioned in the interior of hollow cylindrical casing 12 and includes one or more annular seals 20 and 21, which are positioned or mounted in respective grooves 20a and 21a provided on outer surface 15a of piston 15. Seals 20 and 21 seal piston 15 against the interior surface 22 of cylindrical casing wall 23 of casing 12 to thereby define two fluid reservoirs 24 and 26 in the interior of casing 12.

Casing 12 includes first and second opposed open ends 30 and 32, which are aligned and spaced along a longitudinal axis 29 of casing 12. First open end 30 is closed by a pressure plate 34, which is mounted to first end 30 as will be more fully described below. Similarly, second open end 32 is closed by an end cap or gland nut 36, which is mounted to second open end 32, which will also be more fully described below. The rod end 38 of rod 16 extends through end cap or gland nut 36 and includes a transverse aperture 38a for receiving a bolt or pin for attachment to a component or a part of a machine or the like. Pressure plate 34 includes a tubular coupler 40 for fixing the base end of cylinder 10, as would be understood by those having ordinary skill in the art. Rod end 38 moves between extended positions and retracted positions for applying compressive and tension forces, respectively, in response to fluid pressures in fluid reservoirs 24 and 26.

Fluid 39, such as hydraulic fluid, air, or air over oil, is introduced into first fluid reservoir 24 through a first threaded port 42, which is preferably provided in pressure plate 34. However, it should be understood that first port 42 may be optionally located in casing wall 23. Similarly, fluid 39 is introduced into second reservoir 26 through a second threaded port 46, which is preferably provided in end cap or gland nut 36. In this manner, the position of piston is varied by the fluid pressure of the fluid in reservoirs 24 and 26 which is controlled through fluid injected or withdrawn through ports 42 and 46.

Figure 4:
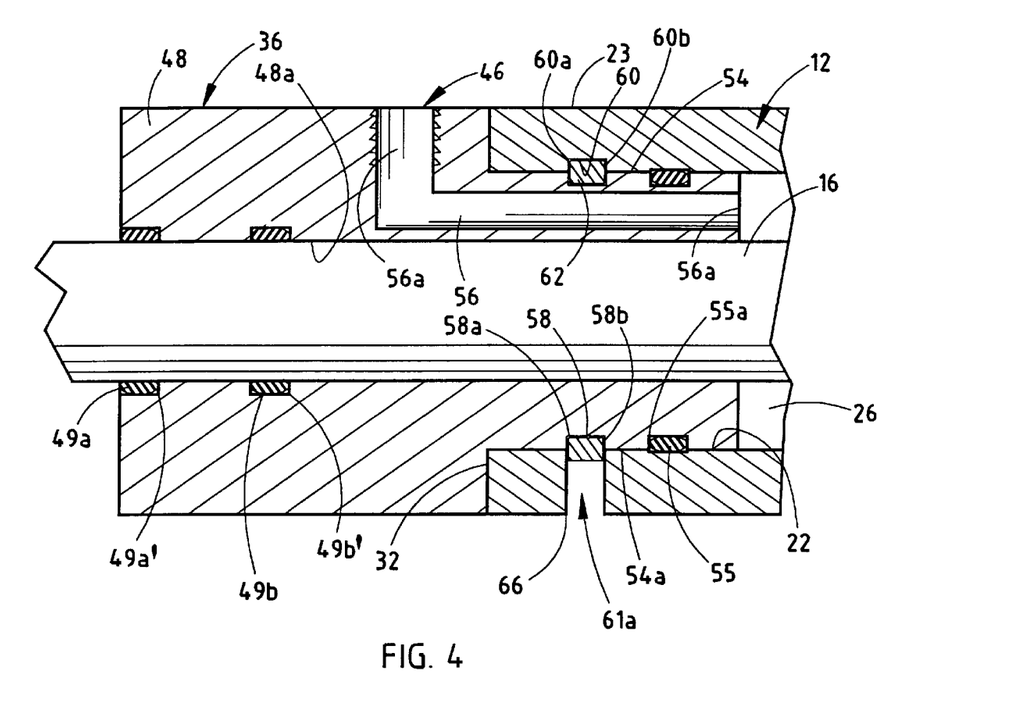
FIG. 4 is a cross-sectional view taken along line IV—IV of FIG. 3.

As best seen in FIG. 4, gland nut 36 includes an annular cylindrical base member 48 with an outer diameter which is generally commensurate in size with the outer diameter of cylindrical casing 12. Cylindrical base member 48 includes a transverse passage 48a and an annular cylindrical collar 54 which extends inwardly into second open free end 32 of cylindrical casing 12. Rod 16 extends from piston 15 through transverse passage 48a to move between extended and retracted positions to apply compressive and tension forces, respectively, as is understood by those having ordinary skill in the art. In order to provide a fluid tight seal, annular cylindrical collar 54 includes at least one annular seal or O-ring 55 on its outer surface 54a, which is positioned in a groove 55a and seals against the inner surface 22 of casing 12. Additionally, positioned in transverse passageway 48a are two longitudinally spaced annular seals or O-rings 49a and 49b which are respectively positioned in grooves 49a' and 49b' and seal against rod 16.

As described above, gland nut 36 includes second port 46 which is preferably recessed and extends inwardly into cylindrical member 48. Port 46 is in fluid communication with second reservoir 26 through a passageway 56 which extends from port 46 through cylindrical member 48 and through annular cylindrical collar 54. Passageway 56 includes an inlet opening 56a, which is in communication with port 46, and an outlet opening 56b, which is in communication with second reservoir 26. In addition, annular collar member 54 includes an annular groove or slot 58 which is positioned along longitudinal axis 36a of gland nut 36 between groove 55a and annular cylindrical member 48. Similarly, inner surface 22 of cylindrical casing 12 includes a corresponding annular slot or groove 60 which aligns with slot 58 of gland nut 36 such that when gland nut 36 is inserted into second open end 32 of cylindrical casing 12, grooves 60 and 58 align and define a cavity 61 therebetween.

Referring to FIGS. 2–4, a retaining member 61 is inserted and positioned in cavity 61 between grooves 58 and 60 of gland nut 36 and casing 12, respectively. Retaining member 61 preferably comprises a wire member 62 and, more preferably, a wire member with a generally rectangular solid cross-section, which substantially fills cavity 61a formed by the aligned grooves 58 and 60 so that wire member 62 limits relative longitudinal movement of gland nut 36 with respect to casing 12 and retains gland nut 36 on casing 12. However, wire member 62 does not limit relative rotational movement of gland nut 36 with respect to casing 12 and, therefore, permits rotation of gland nut 36 about longitudinal axis 29 of casing 12. Thus, the position of second port 42 may be easily adjusted 360° about longitudinal axis 29 of casing 12.

Wire member 62 is installed in cavity 61a through a slotted opening 66 provided on casing wall 23, which includes a longitudinal extent which extends around the circumference of casing wall 23. A first end 62a of wire member 62 is inserted into casing 12 through opening 66 and pushed into cavity 61 a via opening 66 until first end 62a of wire member 62 extends around annular cavity 61a formed between slots 58 and 60. In this manner, opposed sides 62b and 62c of wire member 62 abut or bear against the respective side walls 58a and 58b and 60a and 60b of grooves 58 and 60 to restrict relative longitudinal movement of gland nut 36 and casing 12. However, grooves 58 and 60 provide annular guide surfaces for wire member 62 and, thus, permit gland nut 36 to rotate on casing 12 over a range of 360° about longitudinal axis 29. Consequently, port 46 is freely positionable about longitudinal axis 29 of casing 12 to accommodate a wide variety of applications. Moreover, by locating port 46 in gland nut 36, the overall length of the cylinder 10 may be reduced by approximately the diameter of the port. A reduced cylinder length further increases the application of the cylinder and permits overall equipment dimensions to be reduced, which can significantly reduce the weight and cost of the equipment.

Figure 5:
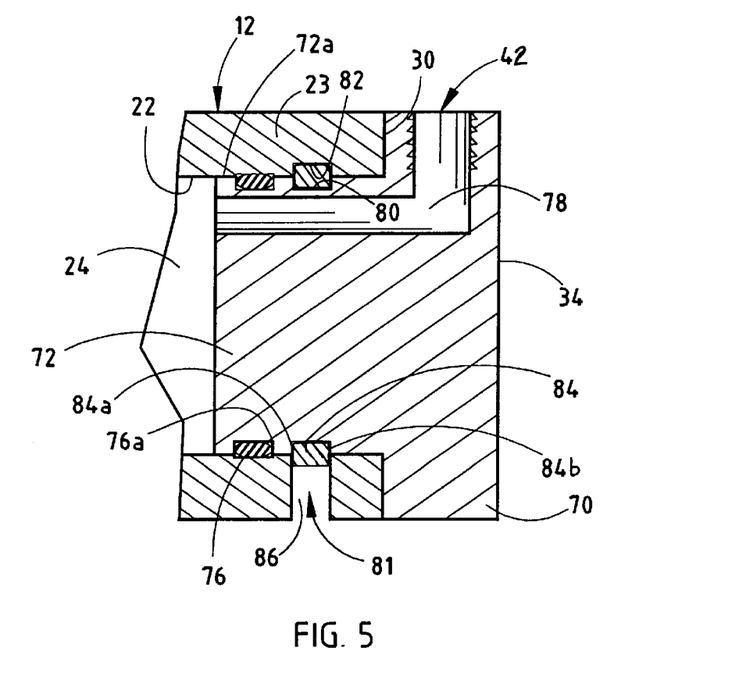
FIG. 5 is a cross-sectional view taken along line V—V of FIG. 3.

Referring to FIG. 5, pressure plate 34 includes a cylindrical base member 70 which has an outer diameter commensurate in size with the outer diameter of casing 12. Cylindrical base member 70 includes a central portion 72, which has an outer diameter commensurate in size with the inner diameter of casing 12 so that central portion 72 can be inserted into open end 30 of casing 12 thereby defining first reservoir 24. Positioned at or near the end 74 of central portion 72 is an annular seal or O-ring 76 which is preferably positioned in an annular groove 76a provided on outer surface 72a of central portion 72 and seals against the inner surface 22 of casing 12 for forming a fluid tight seal to seal first reservoir 24.

As described previously, pressure plate 34 includes port 42 for introducing fluid into first reservoir 24 of casing 12. Port 42 extends into cylindrical base member 70 and is preferably recessed in pressure plate 34. Port 42 communicates with reservoir 24 through a passageway 78 which extends from port 42 through base member 70 and through central portion 72 to reservoir 24. Similar to gland nut 36, pressure plate 34 includes an annular groove or slot 80, and inner surface 22 of casing 12 includes a corresponding annular groove or slot 82 which aligns with annular groove 80 of pressure plate 34 when central portion 72 is inserted into first open end 30 of casing 12. Positioned in the cavity 81, defined by grooves 80 and 82, is a second retaining member 83. Preferably, retaining member 83 comprises a wire member 84 and, more preferably, a wire member with a rectangular cross-section. Similar to wire member 62, wire member 84 includes opposed sides 84a and 84b which abut the respective sides 80a and 80b and 82a and 82b of grooves 80 and 82, respectively, to limit the relative longitudinal movement of pressure plate 34 with respect to casing 12 and thereby secure pressure plate 34 to casing 12. However, grooves 80 and 82 provide annular guides for wire member 84 and permit 360° rotation of pressure plate 34 on casing 12. Thus, the position of port 42 is easily adjusted about longitudinal axis 29 of cylindrical casing 12. In this manner, both ports 42 and 46 are adjustable 360° about longitudinal axis 29 of casing 12 which permits broader application and simpler installation than conventional cylinders. Furthermore, the overall length of cylinder 10 is further reduced by the diameter of second port 42. Moreover, with recessed ports, the likelihood of injury associated with handling cylinders with projecting ports is essentially eliminated. Similar to the first embodiment, wire member 84 is inserted into cavity 81 by way of a second slotted opening 86 provided in casing wall 23. Wire member 84 is of similar construction to wire member 62 and, therefore, reference is made thereto for further details.

Figure 7:
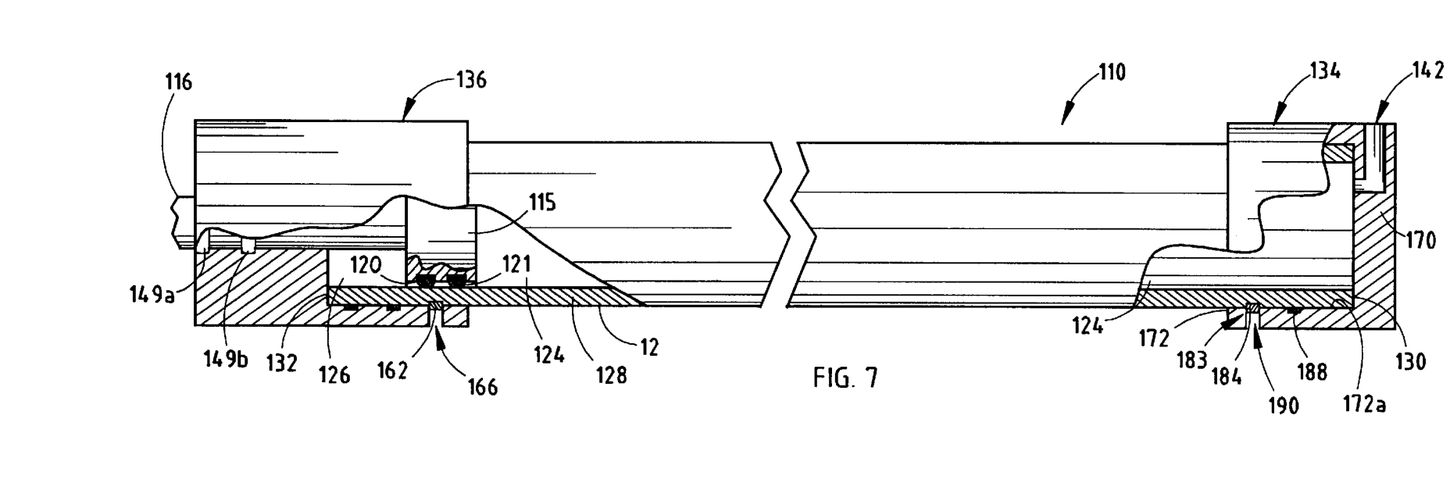
FIG. 7 is a partial fragmentary view of the cylinder of FIG. 6.

Referring to FIGS. 6 and 7, a second embodiment 110 of a double acting cylinder is illustrated. Cylinder 110 includes a hollow tubular or cylindrical casing 112 and a piston rod assembly 114 which is positioned in the interior of hollow cylindrical casing 112. Piston rod assembly 114 includes a piston 115 and a rod 116 with a rod end 138, which extends from casing 12, as will be more fully described below. Piston 115 includes one or more annular seals 120 and 121 which are positioned in respective grooves 120a and 121a provided on outer surface 115a of piston 115 and which seal piston 115 against the interior surface 122 of cylindrical casing 112 to thereby define to first and second fluid reservoirs 124 and 126 in interior of casing 112.

Cylindrical casing 112 includes a casing wall 128 which extends along a longitudinal axis 129 of cylindrical casing 112. Casing wall 128 defines first and second open ends 130 and 132 which are respectively closed by a pressure plate 134 and a cap or gland nut 136. Rod end 138 of rod 116 extends through cap or gland nut 136 and includes a transverse aperture 138a for receiving a bolt or load pin for attachment to a component or a part of a machine, or the like. Similarly, mounted to pressure plate 134 is a tubular coupler 140 for receiving a bolt or a load pin for securing the second end of cylinder 110. Fluid is introduced into first reservoir 124 through a first port 142, which is preferably provided in pressure plate 134. Similarly, fluid is introduced into second reservoir 126 through a second port 146, which is provided in end cap or gland nut 136. As fluid is introduced into first and second reservoirs 124 and 126, the position of piston 114 is varied as function of the differential pressures of fluid in reservoirs 124 and 126 which causes rod end 138 to move between extended and retracted positions for applying compressive or tension forces, as is known in the art.

Figure 8:
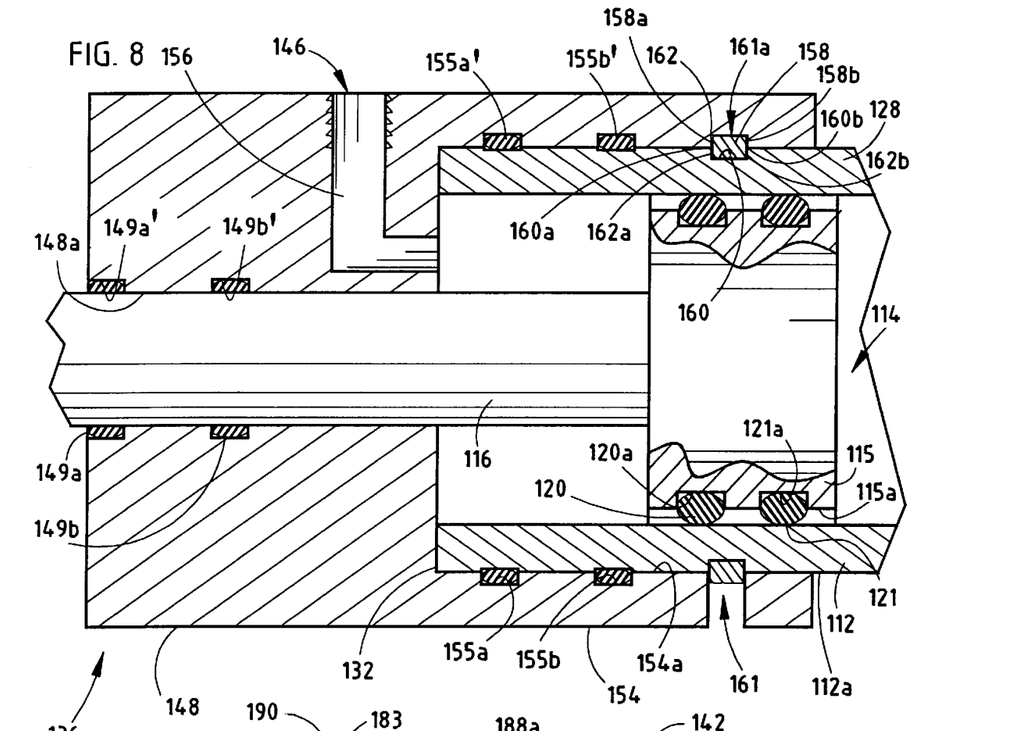
FIG. 8 is a cross-sectional view taken along line VIII—VIII of FIG. 7.

Referring to FIG. 8, gland nut 136 comprises a cylindrical member 148 with a projecting annular collar 154 which defines a receptacle for receiving second open end 132 of cylindrical casing 112. Cylindrical member 148 includes a transverse passage 148a through which rod 116 extends for coupling to a component or a part of a machine or the like as described in reference to the first embodiment. Inner wall 154a of annular collar 154 includes a first annular groove or slot 158, which aligns with a second groove 160, which is provided on outer surface 112a of cylindrical casing 112 to thereby define a cavity 161a. Similar to the first embodiment, a retaining member 161 is positioned in cavity 161a through a slotted recess 166 provided in gland nut 136 to couple gland nut 136 to cylindrical casing 112 in a manner that limits longitudinal movement of gland nut 136 with respect to cylindrical casing 112 and yet permits rotational movement of gland nut 136 about longitudinal axis 129 of cylindrical casing 112. Preferably, retaining member 161 comprises a wire member 162 and, more preferably, a wire member with a rectangular cross-section which includes opposed sides 162a and 162b for abutting or bearing on the respective side walls 158a and 158b and 160a and 160b of grooves 158 and 160, respectively. Thus, grooves 158 and 160 define stops which limit the longitudinal movement of gland nut 136 with respect to casing 112 and define annular guides to permit relative rotation.

As described above, gland nut 136 includes second port 146 which is preferably recessed in gland nut 136 and is fluid communication with a passageway 156, which extends from port 146 through gland nut 136 to second reservoir 126. In this manner, repositioning of gland nut 136 permits repositioning of port 146 about the longitudinal axis 129 of cylindrical casing 112. Furthermore, by locating the port in the gland nut, the overall dimensions of the cylinder may be reduced by the diameter of the port.

Again referring to FIG. 8, gland nut 136 includes one or more annular seals or O-rings 155a and 155b which are provided on inner surface 154a of annular collar 154. Preferably, annular seals or O-rings 155a and 155b are positioned in corresponding grooves 155a' and 155b' provided on inner surface 154a of collar 154. Additionally, positioned in passageway 136a of gland nut 136, are seals or O-rings 149a and 149b which are positioned in respective grooves 149a' and 149b' formed on the inner surface of passageway 148a and seal against rod 116.

Figure 9:
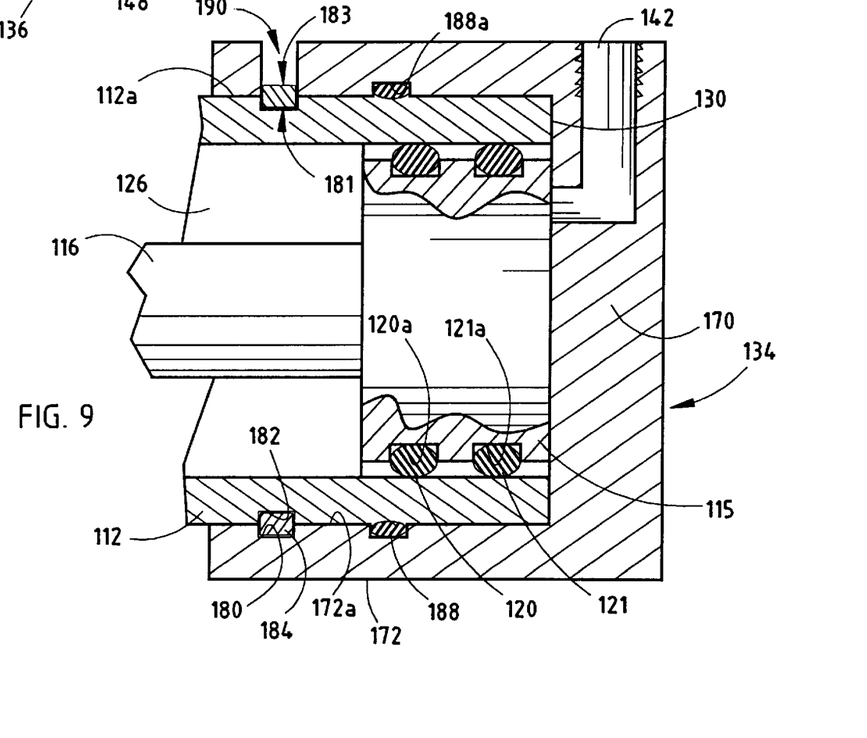
FIG. 9 is a cross-sectional view taken along line IX—IX of FIG. 7.

As best seen in FIG. 9, pressure plate 134 comprises a collar shape member having a base member 170 and a projecting cylindrical wall 172, which defines a cavity for receiving first end 130 of cylindrical casing 112. Preferably, base member 170 includes first port 142, which is in fluid communication with first reservoir 124 for introducing fluid into first reservoir 124. Pressure plate 134 is similarly coupled to the first end of cylindrical casing 112 by a second retaining member 183, for example a wire member 184. Inner surface 172a of cylindrical wall 172 includes a third annular groove or slot 180 which aligns with a corresponding annular groove or slot 182 provided on outer surface 112a adjacent first end 130 of cylindrical casing 112. Grooves 180 and 182 define therebetween a cavity 181 in which wire member 184 is inserted to couple pressure plate 134 to the first end of cylindrical casing 112. Wire member 184 is inserted into a second slotted opening 190 provided in cylindrical wall 172 of pressure plate 134 and is of a similar construction to wire members 62, 84, and 162 and, therefore, reference is made thereto for further details. Similar to wire member 84, wire member 184 limits the relative longitudinal movement of pressure plate 134 with respect to casing 112 and secures pressure plate 134 to casing 112 and yet permits rotation of pressure plate 134 on casing 112. Thus, wire member 184 permits repositioning of port 142 about longitudinal axis 129 of cylindrical casing 112. In this manner, both ports are adjustable 360° about longitudinal axis 129 of casing 112 to allow broader application and simpler installation sequences than conventional cylinders. Furthermore, as described in reference to the first embodiment, the overall length of cylinder 10 is further reduced by the diameter of second port 142.

In order to provide a fluid type cylinder 110, pressure plate 134 includes an annular or O-ring seal 188 which is positioned in an annular groove 188a provided on inner surface 172a of cylindrical wall 172 of pressure plate 134.

Figure 10:
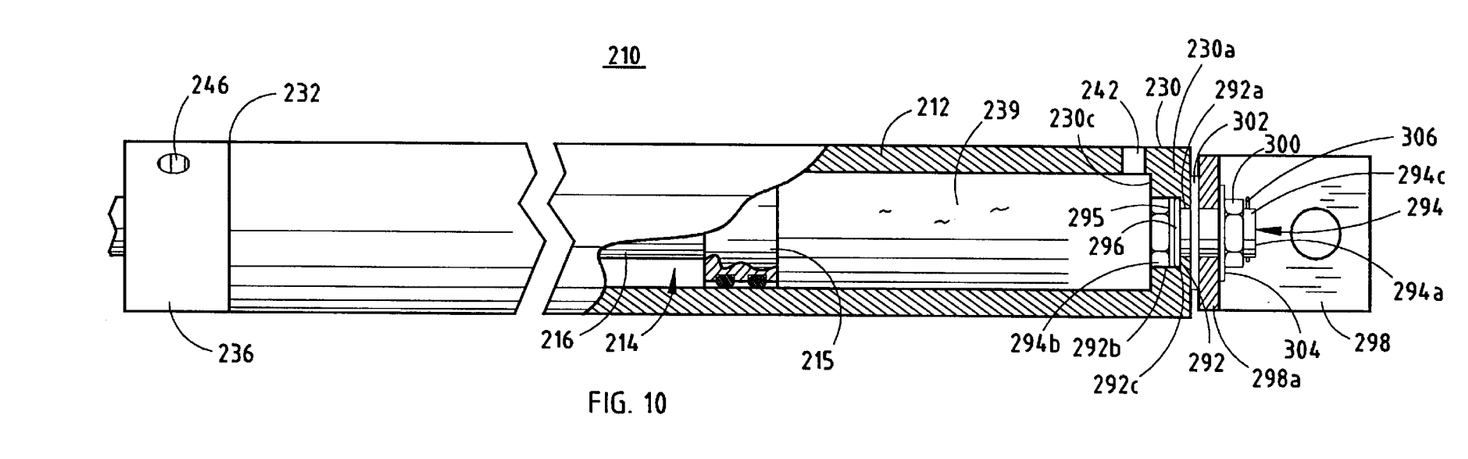
FIG. 10 is a side view of a cylinder with an attachment rotatably mounted to a closed end of the cylinder.

Referring now to FIG. 10, another embodiment 210 of a double-acting cylinder is illustrated. Cylinder 210 includes a hollow tubular or cylindrical metal casing 212 and a piston rod assembly 214 which further includes a piston 215 mounted onto a piston rod 216. Cylindrical casing 212 encases piston rod assembly 214 and includes first and second ends 230 and 232. Second end 232 is open such that an end cap or gland nut 236 may be mounted to second open end 232, thereby closing second end 232. First end 230 is closed by an end wall 230a, which may be welded to or otherwise formed with cylindrical casing 212. Fluid 239 is introduced into cylinder 210 through first and second ports 242 and 246. Piston rod assembly 214 and gland nut 236 may be assembled within cylinder 210 similar to that of cylinder 10, as discussed above, such that end cap or gland nut 236 is longitudinally restrained relative cylinder 210, while being rotatable about the longitudinal axis of cylinder 210.

Cylindrical casing 212 is bored through end wall 230a along longitudinal axis 229, such that a cylindrical passage or opening 292 is bored or otherwise formed entirely through end wall 230a. Cylindrical opening 292 includes a first and second section 292a and 292b. First section 292a has a substantially circular cross-section and extends into end wall 230a from an exterior surface 230b of end wall 230a, while second section 292b extends from an end of first section 292a to an interior surface 230c of end wall 230a. A mounting extension 294, which may include a pair of corresponding fasteners, one of which may be a bolt or other type of elongated fastening device 294a, is inserted through opening 292 from within cylindrical casing 212, such that a head 294b on fastener 294a at least partially inserts into second section 292b of opening 292. Second section 292b may have a circular cross-section which is of a large diameter than first section 92a. However, second section 292b is preferably substantially noncircular to prevent rotation of head 294b of fastener 294a, as discussed below. A washer 295 and an O-ring 296 may also be included along fastener 294a and positioned between head 294b and a substantially flat annular surface 292c at a junction of first and second sections 292a and 292b. O-ring 296 seals end wall 230a about fastener 294a to prevent fluid 239 from leaking around fastener 294a as the fluid is pressurized within cylindrical casing 212. An end 294c of fastener 294a opposite head 294b protrudes through passage 292 in end wall 230a, extending outwardly from exterior surface 230b of end wall 230a. End 294c further extends through a base 298a of a mounting attachment 298, which may be a tubular coupler, a clevis coupler or the like. Mounting extension 294 further includes a female connector or fastener 300 corresponding to fastener 294a, which attaches to end 294c of fastener 294a to secure mounting attachment 298 to cylinder 210. Preferably, end 294c is a male fastener such as a threaded bolt or the like, and fastener 300 is a correspondingly threaded female fastener such as a nut or the like. A washer 302 may be provided between base 298a of mounting attachment 298 and exterior surface 230b of end wall 230a, to provide spacing between mounting attachment 298 and end wall 230a and to further provide a surface against which mounting attachment 298 may rotate. Clearly, more or less washers may be implemented along with a longer or shorter elongated fastener to accommodate for various cylinder length requirements without affecting the scope of the present invention. By using a longer elongated fastener and optionally a larger washer or multiple washers, the attachment point of mounting attachment 298 may be longitudinally extended to engage a piece of machinery or equipment that requires a larger space between its corresponding attachment points, without having to provide a custom cylinder that incorporates the additional length within its cylindrical wall and/or piston rod. Additionally, a washer 304 may be provided between female fastener 300 and base portion 298a to ease the tightening of female fastener 300.

When cylinder 210 is installed in its various applications, mounting attachment 298 is rotatable relative cylindrical casing 212 so as to provide easy alignment of mounting attachment 298 with its corresponding attachment on the targeted piece of machinery or equipment. Fastener 300 is initially loosely secured to end 294c so that base 298a of mounting attachment may pivot 360 degrees around fastener 294a. A locking mechanism 306 such as a pin or the like may be provided at end 294c to prevent female fastener 300 from becoming disconnected from fastener 294a prior to securing the fasteners together. Once the desired orientation between mounting attachment 298 and the equipment is obtained, female fastener 300 may be tightly secured on the end 294c of fastener 294a, thereby securing mounting attachment 298 to cylinder 210.

Preferably, head 294b on fastener 294a is substantially non-circular, for example a hex head, and second section 292b is correspondingly formed such that second section 292b substantially prevents rotation of elongated fastener 294a as corresponding fastener 300 is tightened on end 294c. Prior to tightening fastener 300 onto end 294c, cylindrical casing 212 may additionally be rotated to align port 242 with its corresponding connection on the targeted piece of machinery or equipment. Although the mounting extension is preferably a threaded fastener, other means for rotatably mounting the mounting attachment to the extension may be implemented without affecting the scope of the present invention. For example, corresponding fastener 300 may instead be a lock-pin inserted through the shaft of the mounting extension or a snap fit fastener that presses onto the mounting extension. Furthermore, the fasteners may be reversed, such that a female fastener is secured within the cylindrical casing such that an elongated fastener may be inserted through passage 292 to rotatably and/or fixedly engage the interior fastener.

Figure 11:
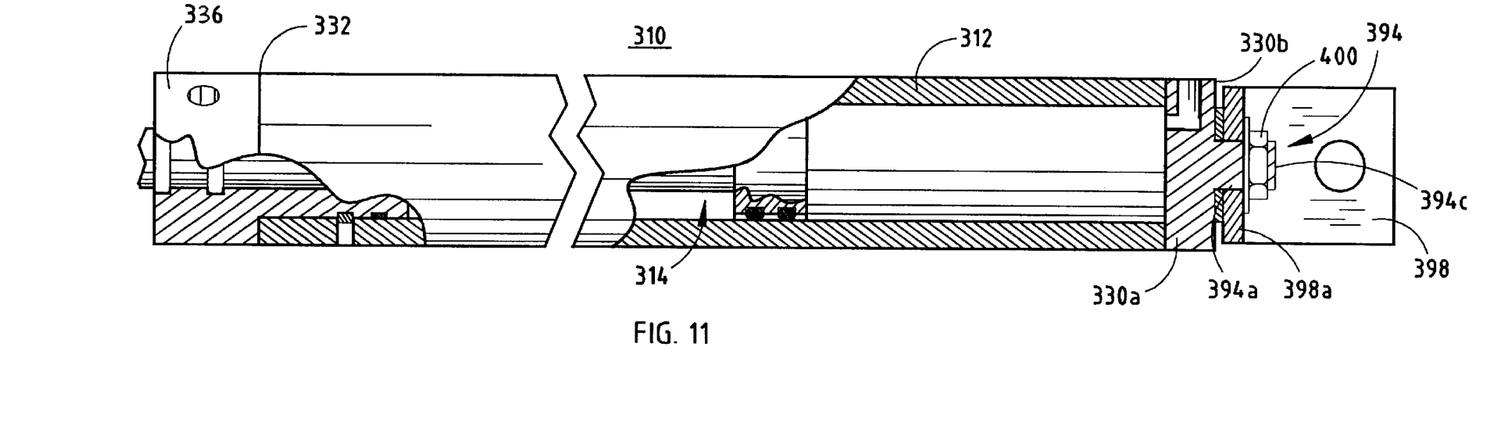
FIG. 11 is a side view of a cylinder with an attachment rotatably mounted to a pressure plate of the cylinder.

In another form, as shown in FIG. 11, a cylinder 310, which is substantially similar to cylinder 210 discussed above, includes a cylindrical casing 312, within which a piston assembly 314 is positioned. Cylindrical casing 312 may include an open end 332 sealed by a gland nut 336 and a base member that defines a closed end wall 330a longitudinally opposite open end 332. Base member 330a may be welded or otherwise rigidly secured to cylindrical casing 312, and may further include a port 342 for fluid communication into cylindrical casing 312. A mounting extension 394 may include a stud 394a secured to an exterior surface 330b of base member 330a and extending outward therefrom. However, stud 394a of mounting extension 394 may alternatively extend through base member 330a, in a similar fashion as elongated fastener 294a of mounting extension 294 extends through end wall 230a of cylinder 210 in FIG. 10. Stud 394a is inserted through a base portion 398a of a mounting attachment 398, such that a fastener 400 corresponding to an outer end 394c of stud 394a may be secured to stud 394a, while still allowing mounting attachment 398 to rotate relative base member 330a and cylinder 310. The length of stud 394a may vary according to various applications such that a common cylinder may be used for a number of applications simply by securing a different length stud to the base member 330a, rather than implementing a number of customized cylinders of varying lengths. Corresponding fastener 400 may again fixedly secure mounting attachment 398 to base member 330a when the desired orientation of mounting attachment 398 relative base member 330a and its corresponding port is achieved.

Figure 12:
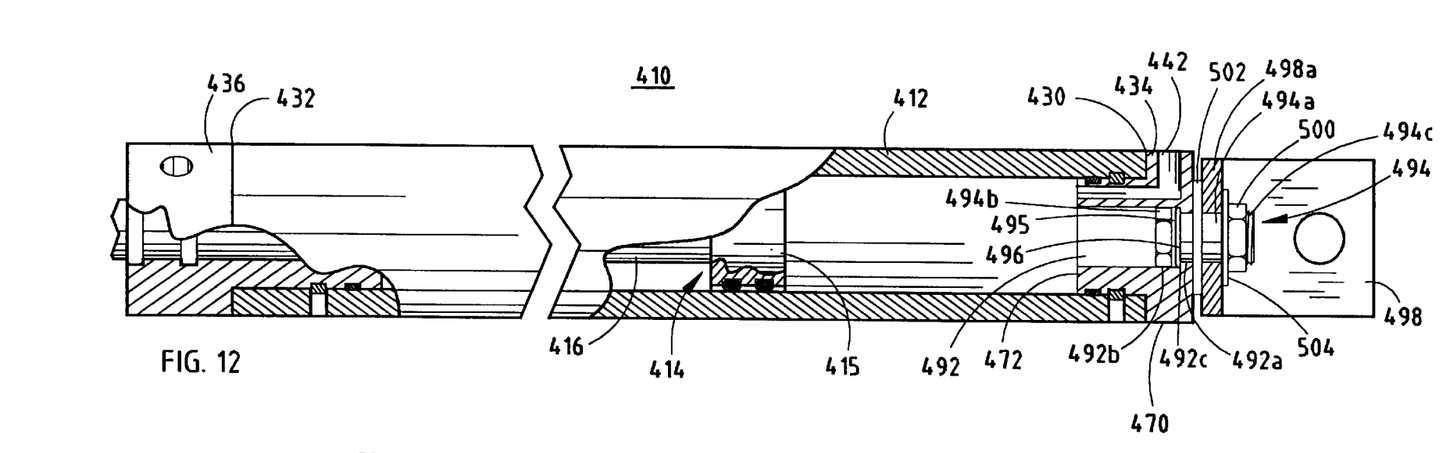
FIG. 12 is a side view of the cylinder of FIG. 1 with an attachment rotatably mounted to a pressure plate of the cylinder.

Referring now to FIG. 12, a cylinder 410 is shown that includes a piston rod assembly 414 positioned within a cylindrical casing 412. Piston rod assembly includes a piston rod 416 and a piston 415, whereby piston rod 416 extends through an end cap or gland nut 436 at an open end 432 of cylindrical casing 412. Gland nut 436 may be rotatably secured to cylindrical casing 412, as discussed above with respect to gland nut 36 on cylinder 10. At an end 430 of cylindrical casing 412 longitudinally opposite gland nut 436, a pressure plate 434 is secured to cylindrical casing 412, thereby defining a closed end of cylindrical casing 412. Pressure plate 434 includes a cylindrical base member 470 and a central portion 472, and is rotatably secured within cylindrical casing 412 as discussed above in relation to pressure plate 34 of cylinder 10. A mounting extension 494 includes an elongated fastener 494a, which extends through base member 470 and protrudes outward therefrom. Central portion 472 of base member 470 is bored through or otherwise formed to provide a generally cylindrical passage 492 through which elongated fastener 494a may be inserted. The generally cylindrical passage may include a first section 492a and a second section 492b, where second section 492b has a diameter that is greater than the diameter of first section 492a. A head 494b of elongated fastener 494a rests substantially against an annular flat surface 492c at a junction between first and second sections 492a and 492b of the passage through central portion 472. An O-ring 496 and a washer 495 may be further provided between head 494b and flat annular surface 492c to prevent fluid from leaking out of cylindrical casing 412 as pressure is built up therein. Preferably, head 494b of fastener 494a is non-cylindrical in shape, such as a hexagon or substantially squared shape, and second section 492a of path is then formed correspondingly to the shape of head 494b, to prevent rotation of mounting extension 494 relative base member 470 when elongated fastener 494a is inserted through central portion 472 of base member 470.

Fastener 494a of mounting extension 494 further extends through a base portion 498a of a mounting attachment 498. Mounting attachment 498 may be a tubular coupler or the like or may include a plurality of mounting flanges with holes therethrough for accepting a pin or other attaching mechanism on a corresponding piece of machinery or equipment. Mounting extension 494 further includes a corresponding mounting fastener 500 which secures mounting attachment 498 to base member 470 of cylinder 410. An end 494c opposite head 494b of elongated fastener 494a extends outward from base member 470 and may be threaded or otherwise adapted to receive mounting fastener 500 thereon. As discussed above, with respect to mounting extension 294, elongated fastener 294a may vary in length to adapt cylinder 410 to a variety of cylinder length requirements as set by various targeted applications.

Mounting fastener 500 is rotatably secured to end 494c, thereby preventing longitudinal movement of base portion 498a of mounting attachment 498 along elongated fastener 494a. Mounting fastener 500 allows rotational movement of mounting attachment 498 relative pressure plate 434, which further may rotate relative cylindrical casing 412 as discussed above with respect to cylinder 10. This allows mounting attachment 498 to be rotated according to the orientation of the corresponding mounting pin on the targeted equipment or piece of machinery, while simultaneously allowing pressure plate 434 to rotate so as to align an inlet port 442 to the fluid supply of the target application. Once mounting attachment 498 is properly aligned, mounting fastener 500 may be further secured onto elongated fastener 494a to non-rotatably secure mounting attachment 498 to pressure plate 434. A pin or other form of locking mechanism may be included in the present invention and is preferably secured at end 494c of mounting extension 494, thereby preventing mounting fastener 500 from loosening along elongated fastener 494a and further preventing mounting fastener 500 from detaching from elongated fastener 494a. A washer 502 may be included between base portion 498a of mounting attachment 498 and pressure plate 434, to provide a contact surface between the two components, which allows for greater ease in rotation of mounting attachment 468 relative pressure plate 434. Furthermore, a second washer 504 may be provided between mounting fastener 500 and base portion 498a.

Figure 13:
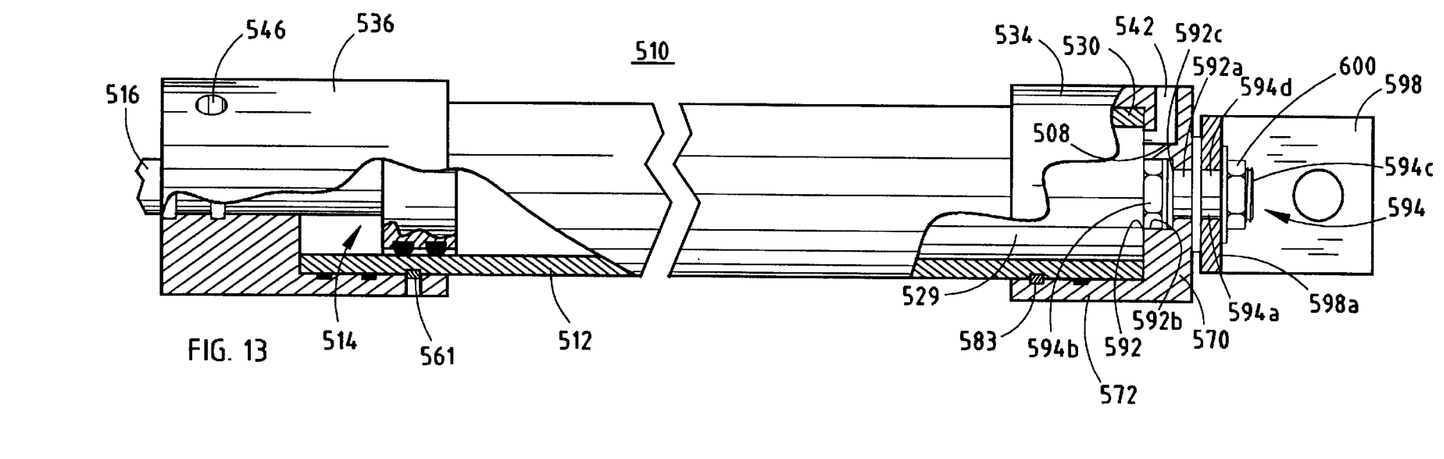
FIG. 13 is a side view of the cylinder of FIG. 6 with an attachment rotatably mounted to a pressure plate of the cylinder.

Referring now to FIG. 13, a cylinder 510 is shown that includes a piston rod assembly 514 within a cylindrical casing 512. Cylindrical casing 512 is closed at one end by a gland nut 536 and at another end by a pressure plate 534. As discussed above relative to cylinder 110, gland nut 536 and pressure plate 534 may extend over an outer surface of cylindrical casing 512 and may further include retaining members 561 and 583, respectively, which allow gland nut 536 and pressure plate 534 to rotate relative cylindrical casing 512, while preventing longitudinal movement therealong.

Pressure plate 534 is a generally collar-shaped member having a base member 570 and a projecting cylindrical wall 572 which encases a first end 530 of cylindrical casing 512. Base member 570 is bored or otherwise formed with a passage or opening 592 through a center portion along a longitudinal axis 529 of cylindrical casing 412. Passage 592 may be formed such that there is first section 592a and a second section 592b, with second section 592b having a diameter greater than first section 592a, thereby forming a substantially flat annular surface 592c at the junction between the first and second sections. A mounting extension 594 includes an elongated fastener 594a and a corresponding mounting fastener 600. Elongated fastener 594a extends through first and second sections 592a and 592b of base member 570, such that a head 594b of fastener 594a rests within a recess 508 formed by the larger second section 592b. Preferably, head 594b is substantially non-cylindrical in shape, such that second section 592b of base member 570 may be correspondingly formed to substantially prevent rotation of mounting extension 594 relative base member 570 by its contact with head 594b of fastener 594a. A shaft 594d of elongated fastener 594a extends outward from pressure plate 534 and further extends through a base portion 598a of mounting attachment 598. The length of elongated fastener 594 may be selected to provide an appropriate distance between the attachment point of mounting attachment 598 and the attachment point of a piston rod 516 of the piston rod assembly 514, without the cost and complexity of customizing a cylinder for each specific application. Mounting fastener 600 may be secured to a shaft end 594c of fastener 594a to prevent longitudinal movement of mounting attachment 598 relative pressure plate 534, while at least initially allowing 360 degrees of rotational movement therebetween. This allows for mounting attachment 598 to be rotated to the proper orientation to correspond to a mounting pin or the like on a piece of equipment or machinery to which cylinder 510 is being applied. Pressure plate 534 and gland nut 536 may also be rotatable relative cylindrical casing 512 to allow fluid inlet ports 542 and 546 to be easily aligned with the fluid supply of the targeted application. Therefore, cylinder 510 substantially eases the installation process of a cylinder, as mounting attachment 598, pressure plate 534 and gland nut 536 may all be rotated relative cylindrical casing 512 as cylinder 510 is installed on a piece of equipment or machinery. Once mounting attachment 598 is oriented to correspond to the attaching mechanism of the piece of equipment or machinery, mounting fastener 600 may be secured such that relative rotation between mounting attachment 598 and pressure plate 534 is substantially precluded.

Elongated fastener 594a and mounting fastener 600 of mounting extension 594 are preferably a male-threaded shaft and a correspondingly female-threaded fastener or nut, respectively. However, other forms of fasteners that prevent longitudinal movement of an item while allowing rotational movement of the item, may be otherwise implemented without affecting the scope of the present invention. For example, mounting fastener 600 may be a lock pin or the like that is inserted through the shaft of the elongated fastener 594a to allow rotation of mounting attachment 598 while preventing longitudinal movement thereof. Mounting fastener 600 and mounting extension 594 may also cooperate as a snap fit arrangement, such that mounting fastener 600 snaps into place over end 594c of elongated fastener 594a, which again prevents longitudinal movement of mounting attachment 598 while allowing rotational movement relative base member 570 of cylinder 510.

While several forms of the invention have been shown and described, other forms will now become apparent to the skilled in the art. For instance, one of the ports which provide communication to the reservoirs of the cylinder may be located on a cylindrical wall of the casing in a conventional manner. Although in the preferred embodiments the ports, are recessed, ports that project outwardly from the outer surface of the gland nut and the pressure plate are also contemplated. Furthermore, the number of seals may be increased or decreased as desired provided a fluid type cylinder is achieved. Furthermore, the mounting extension may be secured through an end wall or base member of a cylinder, or welded or otherwise secured on an exterior surface of the end wall or base member. The corresponding fastener which secures the mounting attachment to the elongated fastener of the mounting extension may thread onto the bolt, stud or the like or otherwise secure thereon to allow rotational movement of the attachment while preventing longitudinal movement thereof.

The embodiments of the invention shown in the drawings are not intended to limit the scope of the invention which is defined by the claims which follow.

The embodiments of the invention in which I claim exclusive property or privilege are defined as follows:

1. A cylinder comprising:
    a cylindrical casing having a casing wall extending along a longitudinal axis and defining an interior, an open end and a closed end, one of said closed end and said casing wall having a first port for delivering fluid into said interior of said casing wall;
    a cap mounted to said open end, said cap including a second port for delivering fluid into said interior of said casing wall;
    a mounting member mounted to said closed end of said casing, said mounting member including a mounting extension and a mounting attachment, said mounting extension protruding from said closed end along said longitudinal axis of said cylindrical casing, said mounting attachment engaging said mounting extension and being rotatably secured thereto; and
    a piston rod assembly positioned in said interior of said casing wall, said piston rod including a rod end and a piston, said piston including at least one seal sealing against an inner surface of said casing wall, said piston dividing said interior into first and second fluid reservoirs, said first port being in fluid communication with said first reservoir, said second port being in fluid communication with said second reservoir, and said rod end extending through said cap moving between extended and retracted portions as a function of fluid pressures in said first and second fluid reservoirs.

2. The cylinder according to claim 1, wherein said mounting extension comprises an elongated extension and a corresponding connector, said connector cooperating with said elongated extension to allow rotation of said mounting attachment relative said cylindrical casing to an attaching orientation.

3. The cylinder according to claim 2, wherein said connector further cooperating with said elongated extension to non-rotatably secure said mounting attachment to said closed end of said cylindrical casing at said attaching orientation.

4. The cylinder according to claim 2 further including a locking mechanism, said locking mechanism cooperating with said elongated extension and said connector to prevent said connector from being removed from said mounting member.

5. The cylinder according to claim 1, wherein said mounting extension extends through said closed end of said cylindrical casing, an interior end of said mounting extension being non-rotatably secured adjacent an interior surface of said closed end.

6. The cylinder according to claim 5, wherein said mounting extension comprises a male fastener and a female corresponding fastener, said male fastener having a fastener head and a attaching end, said fastener head being positioned within said interior of said cylindrical casing, said attaching end extending through a base portion of said mounting attachment, said mounting attachment being rotatably secured to said attaching end with said female fastener.

7. The cylinder according to claim 6 further including an O-ring positioned between said fastener head and said interior of said cylindrical casing.

8. The cylinder according to claim 7, wherein said fastener head is non-rotatably positioned within said interior of said cylindrical casing.

9. The cylinder according to claim 6 further including a locking mechanism, said locking mechanism cooperating with said male and female fasteners to prevent said female fastener from being removed from said male fastener.

10. The cylinder according to claim 1, wherein said mounting extension is fixedly secured at a first end to an exterior surface of said closed end, said mounting extension having a second end extending from said exterior surface of said cylindrical casing.

11. The cylinder according to claim 10, wherein said second end of said mounting extension extends through a base portion of said mounting attachment.

12. The cylinder according to claim 11, wherein said mounting extension includes a ale fastener and a female fastener, said mounting attachment being secured to said male fastener by said female fastener.

13. The cylinder according to claim 1 further comprising a base member secured to said casing wall, said base member defining said closed end such that said mounting member is secured to said base member.

14. A cylinder comprising:

A cylindrical casing having a casing wall extending along a longitudinal axis and defining an interior, an open end, and a closed end, said casing wall having a first annular groove adjacent said open end, one of said closed end and said casing wall having a first port for delivering fluid into said interior of said casing wall;

a mounting member mounted to said closed end of said cavity, said mounting member including a mounting extension and a mounting attachment, said mounting extension protruding from said closed end along said longitudinal axis of said cylindrical casing, said mounting attachment engaging said mounting extension and being at least occasionally rotatably secured thereto;

a cap mounted to said open end, said cap including a second annular groove and a second port for delivering fluid into said interior of said casing wall, said second annular groove being aligned with said first annular groove of said casing wall when said cap is mounted to said open and defining a cavity therebetween;

a wire member positioned in said cavity, said wire member limiting longitudinal movement of said cap with respect to said cylindrical casing and permitting rotational movement of said cap with respect to said cylindrical casing about said longitudinal axis and, thereby, permitting adjustment of the position of said second port about said longitudinal axis of said cylindrical casing; and a piston rod assembly positioned in said interior of said casing, said piston rod including a rod end and a piston, said piston including at least one seal sealing against an inner surface of said casing wall, said piston dividing said interior into first and second fluid reservoirs, said first port being in fluid communication with said first reservoir, said second port being in fluid communication with said second reservoir, and said rod end extending through said cap moving between extended and retracted portions as a function of fluid pressures in said first and second fluid reservoirs.

15. The cylinder according to claim 14, wherein said mounting member comprises an elongated extension and a corresponding connector, said connector cooperating with said elongated extension to allow rotation of said mounting attachment relative said cylindrical casing to an attaching orientation, said connector further cooperating with said elongated extension to non-rotatably secure said mounting attachment to said closed end of said cylindrical cavity at said attaching orientation.

16. The cylinder according to claim 15 further including a locking mechanism, said locking mechanism cooperating with said elongated extension and said connector to prevent said connector from being removed from said elongated extension.

17. The cylinder according to claim 14 further comprising a base member secured to said casing wall, said base member defining said closed end, such that said mounting member is at least occasionally rotatably secured to said base member.

18. The cylinder according to claim 17, wherein said mounting extension extends through said base member, an interior end of said mounting extension being non-rotatably secured adjacent an interior surface of said base member.

19. The cylinder according to claim 17, wherein said mounting extension is fixedly secured at a first end to an exterior surface of said base member, said mounting extension having a second end extending from said exterior surface of said base member, said second end extending through a base portion of said mounting attachment, said base portion being at least occasionally rotatably secured to said second end of said mounting extension.

20. The cylinder according to claim 17 further comprising a second wire member, wherein said base member includes a third annular groove, said casing wall including a fourth annular groove aligned with said third annular groove to define a second cavity when said base member is mounted to said casing wall, and said second wire member positioned in said second cavity to secure said base member to said casing wall, said second wire limiting longitudinal movement of said base member with respect to said casing wall and permitting rotational movement of said base member about said casing wall, said mounting member permitting rotational movement of said mounting attachment relative said base member and relative said casing wall.

21. The cylinder according to claim 20, wherein said mounting extension extends from a recess in an interior surface of said base member longitudinally through said base member, said mounting extension protruding from an exterior surface of said base member.

22. The cylinder according to claim 21, wherein an interior end of said mounting extension is non-rotatably secured within said recess.

23. The cylinder according to claim 22 further including an O-ring through which said mounting extension extends, said O-ring positioned within said recess in said interior surface of said base member.

24. A cylinder comprising:

a cylindrical casing having a casing wall and a longitudinal axis, said casing wall defining an interior and first and second opposed open ends, said casing wall having a first annular groove adjacent said first open end and a second annular groove adjacent said second open end;

a base member mounted to said first open end, said base member having a third annular groove and a first seal sealing against said casing wall, said third annular groove aligning with said first annular groove when said base is mounted to said first open end and defining a first cavity therebetween, and said base member including a first port for delivering fluid into said interior of said casing wall;

a cap mounted to said second open end, said cap including a second port for delivering fluid into said interior of said casing wall, a fourth annular groove, and a second seal sealing against said casing wall, said fourth annular groove aligning with said second annular groove of said casing wall when said cap is mounted to said second open and defining a second cavity therebetween;

a first retaining member positioned in said first cavity, said first retaining member limiting longitudinal movement of said base member with respect to said casing wall and permitting rotational movement of said base member about said casing wall and, thereby, permitting adjustment of the position of said first port about said longitudinal axis of said cylindrical casing;

a second retaining member positioned in said second cavity to thereby limit longitudinal movement of said cap with respect to said cylindrical casing and permit rotational movement of said cap about said cylindrical casing and adjustment of the position of said second port about said longitudinal axis of said cylindrical casing;

a mounting member positioned at said base member, said mounting member including a mounting extension and a mounting attachment, said mounting extension protruding from said base member along said longitudinal axis of said cylindrical casing, said mounting attachment engaging said mounting extension and being rotatably secured thereto, such that said cylinder permits said mounting attachment to rotate relative said base member while further permitting said base member to rotate relative said cylindrical casing; and a piston rod assembly positioned in said interior of said casing, said piston rod assembly including a rod end and a piston, said piston including at least one piston seal sealing against an inner surface of said casing wall, said piston dividing said interior into first and second fluid reservoirs, said first port being in fluid communication with said first reservoir, said second port being in fluid communication with said second reservoir, and said rod end extending through said cap and moving between extended and retracted portions as a function of fluid pressures in said first and second fluid reservoirs.

25. The cylinder according to claim 24, wherein at least one of said cap and said base member is unrestrained about said longitudinal axis and is rotatable 360 degrees about said casing wall, said mounting attachment being further unrestrained about said longitudinal axis and also rotatable 360 degrees about said casing wall.

26. The cylinder according to claim 24, wherein said mounting extension extends from an interior surface of said base member through said base member, said mounting extension protruding from an exterior surface of said base member.

27. The cylinder according to claim 26, wherein an interior end of said mounting extension is non-rotatably secured adjacent said interior surface.

28. The cylinder according to claim 26 further including an O-ring through which said mounting extension extends, said O-ring positioned adjacent said interior surface of said base member.

29. The cylinder according to claim 24, wherein said mounting extension is fixedly secured to an exterior surface of said base member.

* * * * *